United States Patent
Pellegatta et al.

(10) Patent No.: US 6,761,556 B1
(45) Date of Patent: Jul. 13, 2004

(54) SYSTEM FOR CONVEYING BLANKS TO A BLOWING INSTALLATION FOR CONTAINERS

(75) Inventors: Jean-Louis Pellegatta, Le Havre Cedex (FR); Bruno Galloni, Le Havre Cedex (FR)

(73) Assignee: Sidel, Octeville-sur-Mer (FR)

( * ) Notice: Subject to any disclaimer, the term of this patent is extended or adjusted under 35 U.S.C. 154(b) by 0 days.

(21) Appl. No.: 09/979,584
(22) PCT Filed: May 23, 2000
(86) PCT No.: PCT/FR00/01404

§ 371 (c)(1),
(2), (4) Date: Jun. 20, 2002

(87) PCT Pub. No.: WO00/73179

PCT Pub. Date: Dec. 7, 2000

(30) Foreign Application Priority Data

May 27, 1999 (FR) ............................................ 99 06816

(51) Int. Cl.⁷ .......................... B29C 31/08; B65G 47/90
(52) U.S. Cl. ..................... 425/534; 198/803.12; 294/93
(58) Field of Search ................... 425/534; 198/803.12; 294/88, 93

(56) References Cited

U.S. PATENT DOCUMENTS

| | | | | |
|---|---|---|---|---|
| 3,777,875 A | * | 12/1973 | Sobran ........................ | 198/680 |
| 3,945,486 A | * | 3/1976 | Cooper .................... | 198/803.12 |
| 3,981,673 A | * | 9/1976 | Sokolow ...................... | 425/534 |
| 4,086,999 A | * | 5/1978 | McDonald ............. | 198/803.12 |
| 4,310,282 A | * | 1/1982 | Spurr et al. .................. | 425/533 |
| 4,340,249 A | * | 7/1982 | Bucklew ....................... | 294/88 |
| 4,572,355 A | * | 2/1986 | Hunter ................... | 198/803.12 |
| 4,675,070 A | * | 6/1987 | Pasternicki ................. | 425/500 |
| 4,799,853 A | * | 1/1989 | Wrobbel et al. .............. | 294/93 |
| 4,890,726 A | * | 1/1990 | Wissmann ............. | 198/803.12 |
| 6,471,038 B1 | * | 10/2002 | Yung ..................... | 198/803.12 |

* cited by examiner

Primary Examiner—Robert B. Davis
(74) Attorney, Agent, or Firm—Sughrue Mion, PLLC

(57) ABSTRACT

The invention relates to a system of conveyance for a blowing installation for thermoplastic containers, comprising a series of conveyor elements (24) which are fitted with a gripper device (26, 28), whereby each gripper device can move in an axial direction in relation to the conveyor element (24) on which it is borne in order to become axially engaged on the neck (12) of the blank (10). An external radial collar (14) enables said blank (10) to rest upon a bearing surface (23). The invention is characterized in that each conveyor element (24) comprises a stabilizer (34) which can move in an axial direction from a high retracted position to a low position in order to bear upon the blank (10) so that it can be pressed against the bearing surface (23) before the gripper device (26, 28) engages with the collar (12).

11 Claims, 2 Drawing Sheets

SYSTEM FOR CONVEYING BLANKS TO A BLOWING INSTALLATION FOR CONTAINERS

Figure 1:
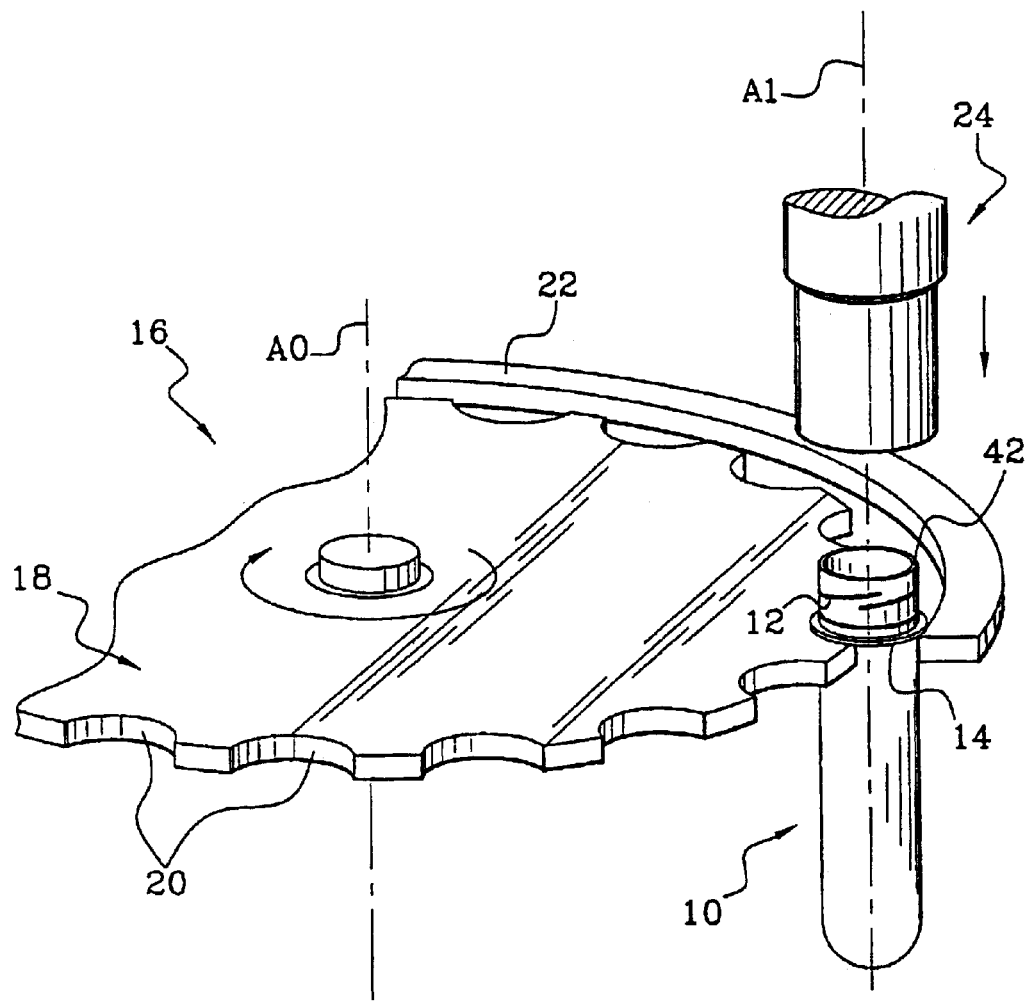

The invention relates to methods for manufacturing hollow thermoplastic objects whereby in a first step, a blank is manufactured by injection prior to obtaining the final container during a method comprising at least one blowing step.

The blank obtained by injection usually has a tubular cylindrical body that is closed at one of its axial extremities and is extended at its other extremity by a neck, also tubular. The neck is usually injected so that it already has its final shape whereas in order to shape the final container, the body of the blank must undergo a rather significant distortion following the blowing operation.

These methods relate in particular to the manufacture of polyethylene terephthalate (PET) containers.

Several variants of these methods make up this family. Based on the method used, the corresponding manufacturing installation comprises one or several thermal conditioning ovens.

In all the methods in question, the blowing of the body of the blank requires that the latter be brought to a temperature that is greater than the glass transition temperature of the material. With this end in view, the blank is subjected to thermal conditioning by having it circulate inside an oven. The oven comprises heating means that are for example made of infrared lamps in front of which the blank is moved using a conveyor element. Advantageously, it is provided that the blank rotate on itself during while being moved in the oven.

The blanks are usually held on the conveyor elements by a gripper device consisting of a mandrel that is engaged inside the blank's neck and holds the latter in place by tightening it against the inner face of the neck. However, in certain cases, the blank is gripped by the outer face of the neck.

In some of these methods, we seek to increase the temperature hold of the final container's body by increasing the PET's crystallinity ratio. This is done by first subjecting the blank to a first blowing phase in order to obtain an intermediate container that in turn is subjected to a heating phase in a thermal treatment oven, a phase during which it shrinks. This shrunken container is then subjected to a second blowing phase that gives it the shape of the final container.

In another method, the neck of the blank, the final container or an intermediate container is what we want to heat in order to increase its crystallinity. Therefore, the installation comprises an adapted thermal treatment oven.

In all cases, we see that the installations for the manufacture of thermoplastic containers can comprise several types of thermal treatment ovens, where these ovens are of course adapted to the thermal treatment that is to be performed. However, all these ovens comprise a conveyor system.

These various systems are thus meant to convey objects that correspond to the various manufacturing phases of the final container. However, they are all conceived to seize this object by the neck, which does not undergo any basic geometric variation, even if certain treatments lead to a change in the structure of the material that constitutes the neck. Also, in the text that follows we will indifferently use the term preform, blank or bottle to designate the object that is to be treated in the oven.

According to a known technique, the conveyor system can for example be comprised of a conveyor link chain that moves continuously on itself.

To seize the preform, a conveyor element comprises a gripper device that moves in an axial direction in relation to the conveyor element and that, when brought from an extreme cleared position to an extreme gripping position, engages in an axial direction on the neck of the blank.

For this to take place, the blank must be brought under the corresponding conveyor element and must be held directly above said element throughout the entire duration of the seizing operation. Yet, during this time, the conveyor element moves continuously, therefore, the blank must also be moved continuously.

With this end in view, the blank is for example supported by a loading wheel that comprises a disk that is driven in rotation around its axis and is fitted, on its periphery, with notches that are more or less semi-circular. An arc of circle guide is arranged around a portion of the disk's periphery in such a way that a blank can be clasped in a radial direction between a notch of the disk and the guide. The blank then rests by a collar located at the base of its neck on both the disk and the guide, where the neck and the body of the preform extend respectively above and under the level of the disk. Thus, the preform is carried by the loading wheel and, through the rotation of the disk, is driven following a circular trajectory.

The loading wheel is arranged in such a way that the circular trajectory of the preform is at a point that is at a tangent to the direction in which the conveyor system moves. The movements of the wheel and the conveyor elements are synchronized so that, at this point of tangency, the blank is arranged in an axial direction directly over the gripper device of one of the conveyor elements. Thus, at this point, the gripper device can be made to move towards its low position to seize the blank by the neck.

Therefore, we note that, at the point of tangency, the blank still rests on the loading wheel and on the guide, which stops right after this point to allow the blank to follow its new trajectory, which is that of the conveyor element.

In theory, at the loading point level, the blank rests by its collar on the loading wheel and its position is perfectly defined by the notch of the disk in which it is clasped.

However, in practice, it is necessary to provide for operating clearances between the blank, the disk and the guide. Therefore, the blank has a certain range of movement in relation to said two elements. Yet, we noted that this range allowed the blank to vibrate on the loading wheel. This is particularly noticeable in high pace installations in which the speed of the blank's movements at the level of the loading wheel is relatively significant. Said vibrations affect the precision of the actual position of the blank's neck at the level of the loading point so that, in some cases, the gripper device and the neck are offset to the point of preventing the blank from being gripped correctly.

Therefore, the objective of the invention it to suggest means that make is possible to ensure that the preform is perfectly stable when it is gripped by the conveyor chain.

With this end in view, the invention suggests a system of conveyance for blowing installations for thermoplastic containers, of the type that comprises a series of conveyor elements fitted with at least one gripper device used to hold a container blank in order to move it along a path inside the installation, of the type in which each gripper device moves in an axial direction in relation to the conveyor element that carries it so that, when it is brought from a high cleared position to a low gripped position, it engages in an axial direction with the blank's neck, where the blank then rests by an external radial collar on a bearing surface, characterized by the fact that each conveyor element comprises a stabilizer that can move in an axial direction from a high retracted position to a low position in order to bear upon the blank so that it can be pressed against the bearing surface before the gripper device engages with the neck.

Based on other characteristics of the invention:

the stabilizer's movements between its high and its low positions are controlled by the movements of the gripper device;

the gripper device comprises a mandrel that engages in an axial direction inside the blank's neck; the stabilizer comprises a bore whose diameter is more or less identical to the internal diameter of the neck and in which the mandrel can slide in an axial direction; and, in the high position, the mandrel is received inside the stabilizer whereas, in the low gripping position, the mandrel extends outside the bore, through a lower opening delimited by the stabilizer's lower bearing edge;

at the beginning of its stroke toward its gripping position, the mandrel drives the stabilizer that comes to rest by its lower edge against the preform in order to press it against the bearing surface; and the mandrel continues its course until it reaches its gripping position;

during its return stroke toward its high cleared position, the mandrel brings the stabilizer back toward its high retracted position;

the mandrel is received and tightened in the stabilizer's bore in such a way that the mandrel drives the stabilizer by adherence;

the mandrel comprises a ring that is elastic in the radial direction so that, in the mandrel's high position, it comes to rest against a lateral wall of the stabilizer's bore and, in the mandrel's low position, it comes to rest against the inner surface of the blank's neck;

the gripping device and the stabilizer are connected in an axial direction by elastic means;

the stabilizer slides in an axial direction in a tubular guide sheath that is integral with the conveyor element, and the stabilizer comes to rest on the upper edge of the blank's neck;

The invention also relates to a thermal conditioning oven for a blowing installation for thermoplastic containers, characterized by the fact that it comprises a system of conveyance that incorporates any one of the previous characteristics.

Figure 2:
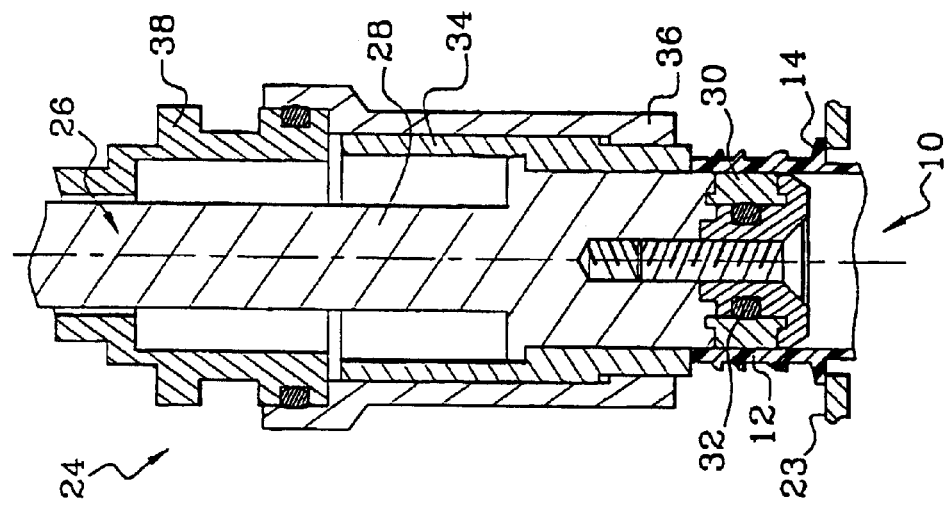
Figure 3:
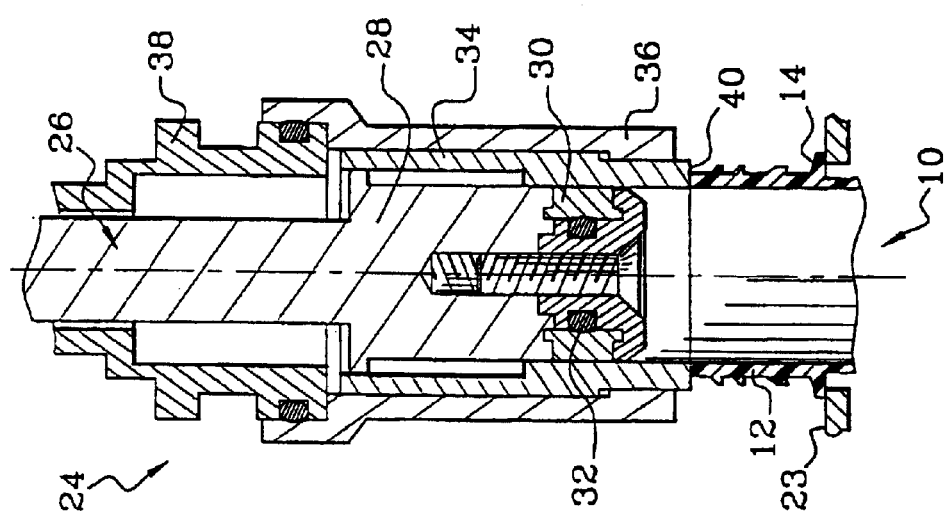
Figure 4:
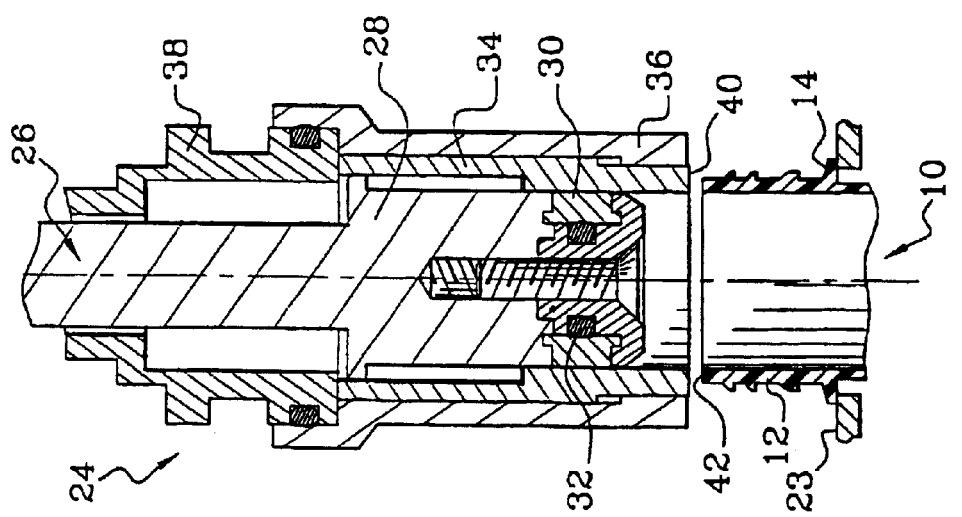

Other characteristics and advantages of the invention will become apparent after reading the following detailed description and looking at the attached drawings where:

FIG. 1 is a perspective schematic view of an example of execution of the means for transferring the preforms towards a system of conveyance as set forth in the invention; and FIGS. 2 through 4 illustrate a conveyor element fitted with a preform stabilizer consistent with the invention, where the gripping device is illustrated in the high cleared position, in an intermediate stabilization position and in its low gripping position respectively.

The invention will now be described in the particular case of a system of conveyance for a thermal oven that treats thermoplastic preforms 10, for example PET preforms. The preform 10 is made using molding by injection and has a neck 12 that is shaped directly into its final shape, where the neck comprises, at its base, an external radial collar 14. In order to make the description clearer, we will assume throughout the remainder of the text that the preform 10 is arranged vertically, with the neck toward the top, as illustrated in FIGS. 1 and 2. The geometric terms used to describe the invention stem from this agreement and must not be considered as limitations to the scope of the invention.

In FIG. 1 we have illustrated a loading wheel 16 that is an example of execution of the transfer means used to bring the preforms to the thermal conditioning oven in a blowing installation for containers. This example does not limit the scope of the invention. The loading wheel 16 comprises a horizontal disk 18 that is driven in rotation at a constant speed around its axis A0 and is fitted, on its external periphery, with notches 20 that are more or less semicircular. An arc of circle fixed guide 22 is arranged around a portion of the periphery of the disk 18. The disk and the guide are separated in a radial direction by a distance that is more or less equal to half the diameter of the body of the preform below the collar 14.

The performs 10 will each be engaged by feeding means (not represented) into a notch 20 of the disk 18, right in front of the beginning of the arc of circle guide 22. Therefore, the preform is driven by the notch 22 and then becomes clasped in a radial direction between the disk 18 and the guide 22 following a circular trajectory around the axis A0. All along this trajectory, the preform 10 rests by its collar 14, under the sole effect of its weight, on the disk 18 and the guide 22 that form a bearing surface 23.

Thus, the loading wheel transfers the preform 10 to a loading point where the trajectory of the preform on the loading wheel is more or less tangential to that of the conveyor elements of a system of conveyance. The preform 10 is then under one of the conveyor elements 24, along the same axis A1 as the latter.

The system of conveyance could for example be comprised in a known way of a link chain, where for example each link carries one or two conveyor elements. However, the invention could apply to any similar system that ensures the conveyance of a container blank in a blowing installation for containers from a previously injected preform. In particular, we can plan to have the conveyor elements laid out on a rotary crown or set up in the form of independent carriages.

From the point of tangency that corresponds more or less to an extremity of the guide 22, the conveyor element 24 loads the preform 10 so that, in this case, it will follow a path inside the oven.

FIGS. 2 through 4 illustrate three steps of how the conveyor element 24 grips the preform 10.

As can be seen in these schematic figures, the conveyor element 24 comprises a gripper device 26 that moves in an axial direction between a high cleared position and a low gripping position in which it is engaged with the neck 12 of the preform 10. In the example shown, the gripper device 26 comprises, on its lower extremity, a mandrel 28 that will be engaged through tightening inside the neck 12. The mandrel 28 comprises a ring 30 that is received in an annular groove made in the external cylindrical surface of the mandrel 28. An elastomeric o-ring 32 is clasped in a radial direction between the ring 30 and the bottom of the groove, so that the sections of the ring are solicited in a radial direction toward the outside. Thus, when the mandrel 28 is in the low position inside the neck 12, the sections of the ring 30 rest on the internal cylindrical surface of the neck 12, which holds the preform 10 on the gripper mandrel 28. The ring 30 can also be made in the shape of a split annular ring.

As set forth in the teachings of the invention, the conveyor element 24 comprises a stabilizer 34 that moves in an axial direction to come and rest on the preform 10 before the mandrel 28 is engaged with the neck 12. The stabilizer 34 is made in the shape of a tube element mounted as a slide in a tubular guide sheath 36 that is fixed in relation to a main body 38 of the conveyor element 24. The guide sheath 36 is of course open at its lower extremity. The stabilizer's lower extremity forms an annular edge 40 whose dimensions correspond with the upper edge 42 of the neck 12. This upper edge 42 is the edge that will delimit the opening of the final container.

In FIG. 2, the stabilizer 34 is illustrated in a high retracted position in which it rests by its upper extremity against the fixed body 38 of the conveyor element 24.

The stabilizer 34 has an internal cylindrical bore that is open toward the top and the bottom and in which the mandrel 28 is received with possibility of a slide. The diameter of the bore is more or less equal to the internal diameter of the neck 12.

In the high position illustrated in FIG. 2, the mandrel 28 is fully received inside the stabilizer's 28 bore so that its ring 30 rests in a radial direction against the stabilizer 34, which therefore creates a source of friction between the two.

Thus, when the mandrel is moved toward the bottom by its actuating means (not represented), it takes the stabilizer 34 with it in the direction of the preform, until the lower edge 40 of the stabilizer comes to rest against the upper edge 42 of the neck 12 as represented in FIG. 3.

If the preform 10 rests by its collar 14 on the bearing surface 23, the stabilizer 34 is blocked in the axial direction. However, the mandrel 28 can continue its course toward the bottom, where its ring 30 slides on the internal cylindrical wall of the stabilizer 34. This sliding produces a friction force that solicits the stabilizer toward the bottom, where in turn the stabilizer exerts a bearing force on the preform's neck. This bearing force makes it possible it eliminate any possibility of vibration of the preform, which guarantees a stable and perfectly defined position before the mandrel penetrates inside the neck.

In FIG. 4, we can see that, once the preform is stabilized, the mandrel 28 can exit toward the bottom outside the stabilizer so as to penetrate inside the neck, where the ring 30 then cooperates with the internal surface of the latter to make the preform integral with the conveyor element 24.

Once the mandrel is engaged with the neck, the preform 10 can be evacuated from the loading wheel 16 using the system of conveyance as the preform no longer has to be supported by its collar.

To unload the preform from the conveyor element, two options are available.

Thus, we can seize the preform by the neck, for example using either tongs or a retaining surface that would cooperate with the upper surface of the collar 14, and order the mandrel 28 toward the top in order to free it from the neck. In this case, once the ring 30 is out of the neck, it once again cooperates with the stabilizer so as to bring it back toward it high retracted position. In the retracted position, the stabilizer is immobilized in an axial direction toward the top against the body of the conveyor element and the mandrel can continue its freeing movement toward the top by penetrating inside the bore made in the stabilizer.

In this way, we can also plan to have the stabilizer perform the ejection function at the time of the unloading. In this case, we order the mandrel toward its high position. The preform, which is not held back, follows the movement of the mandrel causing the stabilizer to move upward to its retracted position in which it rests against the body 38 of the conveyor element 24. From this position, the preform can no longer move upward so that the mandrel, which follows its course towards its retracted position, exits the neck of the preform and then penetrates into the stabilizer's bore.

In the method of execution of the invention that has just been described, we note that the stabilizer's movements are caused by the movements of the mandrel 28, without the intervention of any other element.

However, in an alternative method of execution (not represented), we for example plan to have the mandrel order the lowering of the stabilizer using a compression spring that is interposed in an axial direction between the two. In this case, when the stabilizer comes in contact with the preform, the spring is compressed, which creates a bearing effort that is transmitted by the stabilizer to the preform. With such a method of execution we must however be careful to choose a spring whose stiffness is not too significant. Indeed, when the preform is cleared from the bearing surface 23, the spring continues to force an axial effort toward the bottom on the preform. If the spring is too stiff, this effort could make the preform slide in relation to the mandrel, which would result in the preform having a bad axial position or even being dropped.

As a variant, we could also plan to have the stabilizer come to rest on the preform's collar 14.

In all cases, we would see that the effort exerted by the stabilizer on the preform be relatively weak so as not to mark the preform. This effort will have to be just sufficient enough to avoid vibrations of the preform.

We will note in the method of execution described above that conversely the stabilizer no longer exerts any effort on the preform once the ring 30 cooperates with the neck 12 and not with the stabilizer.

Therefore the invention makes it possible to guarantee perfect reliability of the preform loading operation on the system of conveyance, even for the high pace machines in which speed of movement of the parts is important.

What is claimed is:

1. System of conveyance for a blowing installation for thermoplastic containers, of the type that comprises a series of conveyor elements (24) fitted with at least one gripper device (26, 28) conceived to carry a blank (10) of the container in order to make it circulate along a path inside the installation, of the type in which each gripper device (26, 28) moves in an axial direction in relation to the conveyor element (24) that carries it so that when it is brought from a cleared high position to a low gripped position, it engages in an axial direction with the neck (12) of the blank (10), where the blank (10) then rests by an external radial collar (14) on a bearing surface (23),
   characterized by the fact that each conveyor element (24) comprises a stabilizer (34) that moves in an axial direction from a high retracted position to a low position to come and rest on the blank (10) in order to press it against the bearing surface (23) before the gripper device (26, 28) engages with the neck (12).

2. System of conveyance as set forth in claim 1, characterized by the fact that the movements of the stabilizer (34) between its high and its low positions are controlled by the movements of the gripper device (26, 28).

3. System of conveyance as set forth in claim 1 or 2, characterized by the fact that the gripper device (26) comprises a mandrel (28) that engages in an axial direction inside the neck (12) of the blank (10), by the fact that the stabilizer (34) comprises a bore whose diameter is more or less identical to the inner diameter of the neck (12) and in which the mandrel (28) can slide in an axial direction, and by the fact that, in the high position, the mandrel (28) is received inside the stabilizer (34) whereas in the low gripping position, the mandrel (28) extends outside the bore, through a lower opening delimited by an upper bearing edge (40) of the stabilizer (34).

4. System of conveyance as set forth in claim 3, characterized by the fact that, at the beginning of its course toward the gripping position, the mandrel (28) drives the stabilizer (34) which comes to rest by its lower edge (40) against the preform (10) so as to press it against the bearing surface (23), where the mandrel (28) continues its course to its gripping position.

5. System of conveyance as set forth in claim 4, characterized by the fact that during its return course toward its high cleared position, the mandrel (28) brings the stabilizer (34) back to its high retracted position.

6. System of conveyance as set forth in claim 3, characterized by the fact that the mandrel (28) is received and tightened in the bore of the stabilizer (34) so that the mandrel (28) drives the stabilizer (34) by adherence.

7. System of conveyance as set forth in claim 6, characterized by the fact that the mandrel (28) comprises a ring (30) that is elastic in relation to the radial direction that, in the mandrel's (28) high position comes to rest against the lateral wall of the bore stabilizer (34) and, in the mandrel's (28) low position, against the inner surface of the neck (12) of the blank (10).

8. System of conveyance as set forth in claim 2, characterized by the fact that the gripper device (26) and the stabilizer (34) are connected in the axial direction by elastic means.

9. System of conveyance as set forth in claim 1, characterized by the fact that the stabilizer (34) slides in an axial direction in a tubular guide sheath (36) that is integral with the conveyor element (38, 24).

10. System of conveyance as set forth in claim 1, characterized by the fact that the stabilizer (34) comes to rest on the upper edge (42) of the neck (12) of the blank (10).

11. Thermal conditioning oven for a blowing installation for thermoplastic containera, characterized by the fact that it comprises a system of conveyance according to claim 1.

* * * * *